Figures 1, 2:
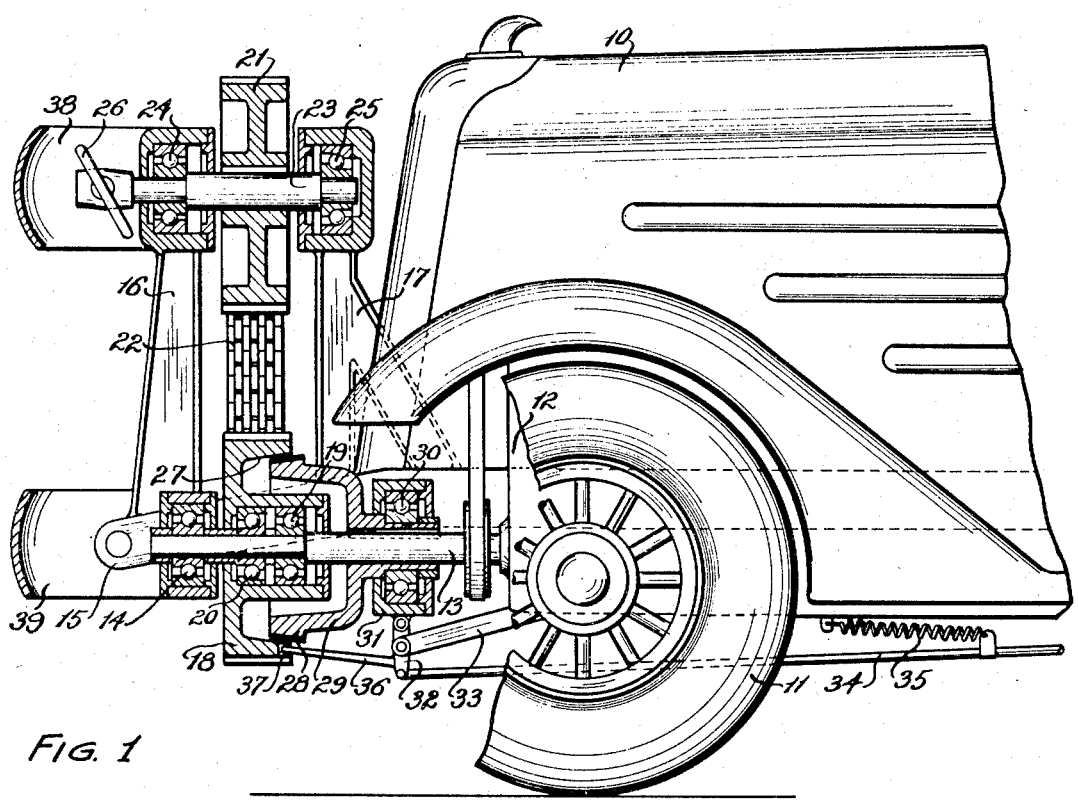

Feb. 21, 1939. E. D. SMITH 2,147,932
BRAKE FOR VEHICLES
Filed May 28, 1936

INVENTOR.
ERASMUS D. SMITH
BY
Kwis, Hudson & Kent
ATTORNEYS.

Patented Feb. 21, 1939

2,147,932

UNITED STATES PATENT OFFICE 2,147,932

BRAKE FOR VEHICLES

Erasmus D. Smith, Warrensville, Ohio

Application May 28, 1936, Serial No. 82,212

2 Claims. (Cl. 188—87)

This invention relates to a mechanism for retarding or braking the movement of a vehicle. Although the invention is applicable to vehicles of various types, such as motor vehicles, trucks, buses and railroad trains, as well as boats, it will be explained herein with reference to its application to a motor vehicle inasmuch as it has especial utility when so used.

An object of the invention is to provide means for retarding the movement of a vehicle which is efficient and which acts effectively irrespective of weather, road, or other similar conditions.

Another object is to provide means for retarding the movement of a vehicle which means can either be driven from the motor of the vehicle or from an independent source of power.

A further object is to provide means for retarding the movement of a vehicle which, when not in use, presents substantially no obstruction to the normal operation of the vehicle.

A further object is to provide means for retarding the movement of a vehicle which may be readily controlled by the operator of the vehicle.

Further and additional objects and advantages will become apparent hereinafter during the detailed description which is to follow of an embodiment of the invention.

A moving vehicle equipped with the usual wheel brakes may be decelerated in its movement by applying the brakes to slow up or prevent the rotation of the wheels. The rate of deceleration of the vehicle is dependent upon the friction between the wheels and the roadway. When this rate of deceleration is exceeded there is the likelihood of the vehicle sliding or skidding. There are a number of conditions which act to vary the amount of friction created between the wheels and the roadway and thus to change the rate of deceleration, such variable conditions being occasioned by roadways formed of different material and having different surface conditions, such as roadways which are wet, muddy, icy or rough. Also the condition of the wheel treads differ in many instances, and it can readily be appreciated that in the case of wheels equipped with tires having rough non-skid treads a much greater degree of friction will exist between the wheels and the roadway than would be obtained in wheels equipped with tires having smooth treads.

The present invention contemplates the provision of means for decelerating the movement of a vehicle which will function substantially in a constant manner as it is not subjected in its functioning to variable conditions to the same extent as are wheel brakes.

The present invention contemplates the employment of means for retarding or decelerating the movement of a vehicle which utilizes the resistant effect of air pressure. More specifically the invention contemplates employing either a variable pitch propeller or a constant pitch propeller which is mounted in a suitable position upon the vehicle and which, when operated, acts to create an air pressure resistance to the movement of the vehicle. The propeller ordinarily is not functioning except at those moments when it is desired to slow up or retard the movement of the vehicle, and will be so positioned when not functioning as to offer substantially no wind resistance to the movement of the vehicle. The propeller will be under the control of the operator of the vehicle and can be driven either from the vehicle motor or from an independent source of power, and said propeller, as previously stated, may be located in any convenient position upon the vehicle, as for example, it may be mounted either at the front, rear, sides or any other place on the vehicle. Wherever the propeller is mounted its blades would be so inclined relative to the roadway and the vehicle that the thrust of the propeller would exert a downward pressure on the vehicle, thus increasing the friction between the wheels and the roadway and thereby supplementing the retarding effect of the air pressure created by the propeller.

In order to clearly explain the invention, one of the various mechanical embodiments which it might take will be described herein and illustrated in the accompanying drawing. In the embodiment to be explained, the propeller is mounted on the front of the vehicle and is driven from the vehicle motor or engine, although, as previously explained, it might be mounted in some other position on the vehicle and also it might be driven by an independent power source. The embodiment to be described shows the propeller mounted upon a motor vehicle of the passenger or pleasure type, but it will be understood that the propeller might be mounted equally as well upon a motor bus, truck, train, boat or any other movable vehicle. It will also be understood that in place of the constant pitch propeller shown, a propeller of the variable pitch type might be desirable in some instances.

Referring to the accompanying drawing illustrating the embodiment of the invention to be described herein, Fig. 1 is a fragmentary side elevational view of a motor vehicle of the passenger or pleasure type with the mechanism embodying the invention mounted on the front end of the vehicle and shown in vertical section taken along the line 1—1 of Fig. 2 looking in the direction of the arrows.

Fig. 2 is a fragmentary front elevational view of the vehicle shown in Fig. 1, with the upper and lower guard members of the retarding mechanism shown in section to more clearly disclose the mechanism lying behind the same.

In the drawing the numeral 10 indicates the front or hood of a motor vehicle of the pleasure or passenger type, the front wheels thereof being shown at 11. The forward portion of the crank case of the engine of the vehicle is indicated at 12, while the shaft 13 constitutes a forward extension of the crank shaft of the engine and may be either integral with said crank shaft or operatively connected thereto. The front end of the forward extension 13 of the crank shaft is supported in a radial bearing 14, in turn carried by a supporting structure connected to the frame of the vehicle and including the forwardly extending members 15 and the upwardly extending members 16 and 17. A sprocket 18 is mounted on the extension 13 of the crank shaft for free rotation thereon by means of radial ball bearings 19 and radial thrust bearings 20. The sprocket 18 is operatively connected with a sprocket 21 through suitable means, such as a link chain belt 22 passing around the sprockets 18 and 21. The sprocket 21 is keyed to a shaft 23 rotatably mounted in a radial bearing 24 and a radial thrust bearing 25 supported by the members 16 and 17.

The shaft 23 has a reduced portion extending forwardly of the radial bearing 24, and to the forward end of said reduced portion of the shaft a two-blade propeller 26 is secured, the blades of said propeller being of such pitch and inclination that when the propeller is driven from the engine of the vehicle, as will later be explained, it will create an air pressure resistance to the forward movement of the vehicle and will also act to exert a downward pressure upon the vehicle to increase the friction between the wheels 11 thereof and the roadway. As previously stated a variable pitch propeller might be employed in place of the constant pitch propeller shown.

The sprocket 18 is provided with an internal conical clutch face 27 with which cooperates the external conical clutch face 28 of a clutch member 29, it being understood that the clutch face 28 is provided with suitable clutch facing material. The clutch member 29 has a sleeve portion which is splined to the shaft 13 to rotate therewith and move axially thereof and said sleeve portion of the clutch member carries the inner race of a deep groove bearing 30, the outer race of which is secured to a bearing housing 31 held against rotative movement but free to move axially with respect to the shaft 13 along with the sleeve portion of the clutch member 29. The upper end of a short lever 32 is pivotally connected to the housing 31, while intermediate its ends the lever 32 is pivotally connected to the forward end of a bracket arm 33 extending forwardly from the motor or frame of the vehicle. The lower end of the lever 32 is connected to a control rod 34 which extends rearwardly beneath the vehicle, and, as will be well understood, is operatively connected to a control lever or other member positioned so as to be conveniently operated by the operator of the vehicle. A spring 35 having one end connected to the vehicle and its other end to the road 34, acts to normally hold said rod in its most forward position, wherefore the clutch faces 27 and 28 are normally disengaged. The lever 32 is provided with a forwardly extending arm or pin 36, which, when the clutch faces are disengaged, will rest in a notch 37 in the sprocket 18 to prevent rotation thereof and to maintain said sprocket in a definite position, such that the propeller at rest will lie substantially in a horizontal plane as indicated in the drawing.

Suitable guard or bumper members 38 and 39 carried by the vehicle extend across the front of the mechanism to protect the same and to prevent any one coming in contact with the propeller while it is rotating.

The operation of the mechanism will now be described.

Assuming that the vehicle is in forward motion and the clutch faces 27 and 28 are disengaged, the propeller 26 will be in the horizontal position due to the fact that the forwardly extending arm or pin 36 of the lever 32 is engaged in the notch 37 in the sprocket 18. When the operator of the vehicle desires to decelerate the forward movement thereof he may do so by application of the usual wheel brakes, and in addition, move the control rod 34 rearwardly against the action of the spring 35 to withdraw the pin 36 from its notch 37 and to shift the clutch member 29 forwardly on the shaft 13 to engage the clutch faces 27 and 28 and thus drive the propeller 26 from the crank shaft of the engine. Of course the deceleration of the forward movement of the vehicle can be accomplished without the application of the usual wheel brakes if desired. It will be understood that when the propeller 26 is being driven from the engine of the vehicle it creates an air pressure resistance to the forward movement of the vehicle, thus decelerating the said forward movement of the vehicle, and by selecting the proper pitch of the propeller this air pressure resistance can be directed downwardly whereby the friction between the wheels of the vehicle at least on one side thereof and the roadway is increased. When the operator desires to disconnect the drive to the propeller after the vehicle has come to a stop or when he wishes to again accelerate the forward movement of the vehicle, he merely releases the control member that is connected to the control rod 34 and the spring 35 moves said rod forwardly to disengage the clutch faces and to again cause the extension 36 to engage in the notch 37 of the sprocket 18 to stop the rotation thereof at a predetermined position, such that the propeller 26 will be in a horizontal position.

Although a preferred embodiment of the invention has been illustrated and described herein, it will be understood that the invention is susceptible of various modifications and adaptations within the scope of the appended claims.

Having thus described my invention I claim:

1. In combination with a motor vehicle, a rotatable propeller carried thereby and adapted when rotated to create an air pressure resistance to the movement of the vehicle, means for driving said propeller, means for controlling said last named means, and means for maintaining said propeller always in a predetermined position when inoperative.

2. In combination with a motor vehicle having an engine of the internal combustion type, a rotatable propeller carried by the vehicle and located at the front end thereof and adapted to create a force tending to move said vehicle rearwardly and thereby retard the forward movement of the vehicle, means for rotating said propeller including an extension of the crank shaft of the engine of the vehicle and clutch mechanism for connecting and disconnecting said propeller to said extension, and means whereby the operator of the vehicle can control said clutch mechanism.

ERASMUS D. SMITH.